W. G. NICHOLS.
METHOD OF MAKING STEEL.
APPLICATION FILED FEB. 25, 1914.
1,100,905.
Patented June 23, 1914.
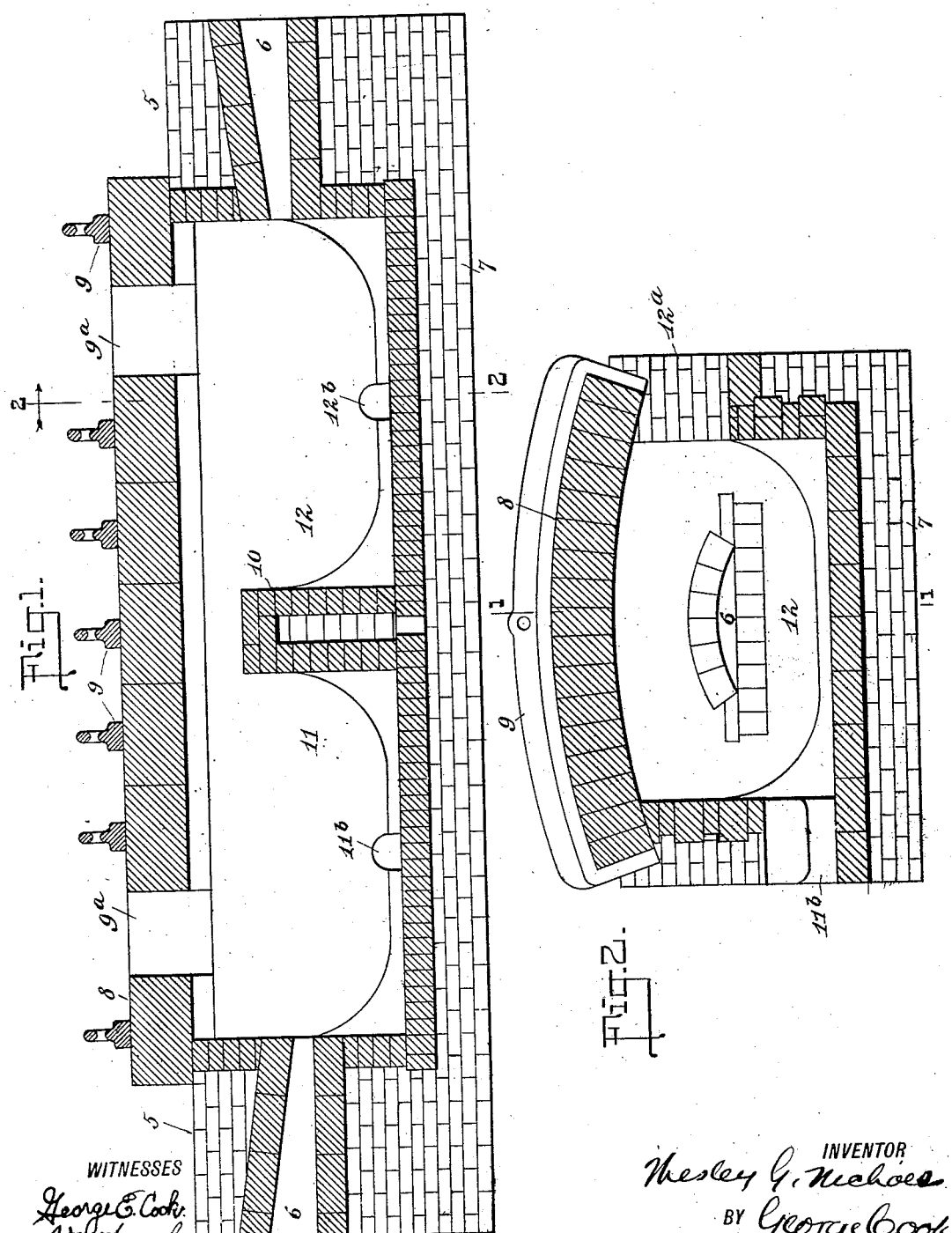
WITNESSES
INVENTOR
Wesley G. Nichols
BY George Cook
ATTORNEY

UNITED STATES PATENT OFFICE.

WESLEY G. NICHOLS, OF CHICAGO HEIGHTS, ILLINOIS.

METHOD OF MAKING STEEL.

1,100,905.   Specification of Letters Patent.   Patented June 23, 1914.

Application filed February 25, 1914. Serial No. 820,843.

*To all whom it may concern:*

Be it known that I, WESLEY G. NICHOLS, a citizen of the United States, and a resident of Chicago Heights, in the county of Cook and State of Illinois, have made and invented certain new and useful Improvements in Methods of Making Steel, of which the following is a specification.

My invention relates to an improved method of making steel, and more particularly to manganese steel, the object being to provide an economical and effective method of producing such by utilizing or employing a large percentage of manganese steel scrap without material loss of its carbon and manganese content.

Many attempts have heretofore been made to devise a method of utilizing manganese steel scrap, but so far as I am aware, but with little or no success, the great difficulty met with being the fact that the high temperature to which the metals are subjected to obtain the necessary fluidity and amalgamation largely or wholly eliminating the manganese contained in the scrap, this loss occurring, as I have learned by experiment, by feeding or introducing into a bath of superheated decarbonized iron the manganese steel scrap, either cold or heated, or by flowing over the heated scrap a superheated charge of the iron. This error, and one into which others have fallen, I have corrected by subjecting each of the several metals, that is, the decarbonized iron, the ferro-manganese, and the manganese steel scrap, to its proper heat treatment, and then finally and thoroughly combining or amalgamating them while in a molten condition, in a common receptacle.

Briefly stated, my process consists in melting in a furnace or converter a pre-determined quantity of decarbonized iron; in another furnace melting a predetermined quantity of manganese steel scrap, and in a third furnace melting a predetermined quantity of ferro-manganese. When the metals are in readiness, each of the same is drawn from its respective melting furnace into a portable ladle, or other suitable receptacle, previously heated to a high degree to avoid chilling or rapid cooling of the product. The making of many hundreds of tons of steel by this process has conclusively proved its economy and effectiveness, the resultant metal being sound and of superior strength, toughness and hardness, and produced at a cost materially less than by any of the well or generally known processes of manufacture.

More specifically described, my improved method consists in melting a predetermined quantity of decarbonized iron, in any suitable kind or type of furnace or converter, the quantity of course, depending on the required amount of finished steel per heat, and the number of heats to be made for each day's cast, this quantity, however, approximating 55% of the total of finished product. This iron is to be heated to a temperature materially higher than that of the other metals, approximating 1650° C., in order that the other metals may be treated at such a low degree of heat as to avoid any and all danger of the loss of the manganese content, yet when combined with the iron, the alloy will be brought to the proper temperature by that of the superheated decarbonized iron. While this melting or converting of the decarbonized iron is proceeding, I simultaneously melt, in a separate furnace, a pre-determined quantity of manganese steel scrap containing approximately 12% manganese, the quantity of scrap being approximately 37% of the total, the temperature to which the melt is brought being preferably about 1400° C. This step of the process, that is, the melting of the scrap, is an important one, and upon it largely depends the economy of the process as well as the quality of the resultant product; for this purpose any suitable furnace is provided, preferably one which is oil heated. This furnace may be constructed with a hearth above the melting zone or chamber, or, if desired, may be provided with two melting zones. In the former instance, the cold manganese steel scrap is placed on the hearth at the rear of the melting zone, for the purpose of preheating it, the metal being brought to almost the melting point while the former charge is being melted. This is the beginning of the critical stage of the melting operation, and requires careful heat adjustment and control, in order that the minimum oxidizing influence be present. For this reason, and for the convenience in the melting of the scrap, I prefer to use the double furnace which I have devised for this particular purpose, and which is illustrated in the accompanying drawings, wherein—

Figure 1 is a longitudinal sectional view thereof, and Fig. 2 a cross-section, taken on the line 2—2 of Fig. 1.

Referring to the drawings, 5—5 represent the ends of the furnace, provided with the openings or ports 6—6 for the passage of the flame thereinto, 7 the bottom of the furnace, and 8 the arched top, the bricks comprising the latter being held in position by the cast steel clamps 9, and provided with the vents 9ᵃ. The interior of the furnace, as well as the ports 6, is of course lined with fire brick or suitable material used for like purposes, the floor of the several chambers of the furnace being preferably concave in form. In the center of the furnace is constructed a bridge wall 10, extending from the floor to within a short distance of the arch 8, thereby dividing the furnace into two melting zones 11, 12, each of which is provided with a charging door (not shown) respectively, and with a tapping hole 11ᵇ and 12ᵇ respectively, through and out of which latter the metal from either compartment may be tapped when desired. In the melting of the scrap in this furnace, the metal is fed into one of the compartments, say compartment 11, through a charging door (not shown), it being understood, for purposes of description, that the compartment 12 contains the scrap in its melted condition. A portion of the heat of the flame turned into this compartment 12 for melting the metal therein, passing over the bridge wall 10 into compartment 11, is sufficient to pre-heat the scrap already fed thereinto, and to bring it to almost the melting point. When the molten metal is ready to be tapped out of the compartment 12, through the hole 12ᵇ, the flame through the port 6 is cut off and turned into the compartment 11, containing the pre-heated scrap, and compartment 12 then charged with cold scrap. The metal in compartment 11, when melted, is then tapped out, and the melting operation thus continued indefinitely.

While the above described furnace is of a convenient form for melting the manganese steel scrap, I do not intend to limit my process to its use, or to the use of any other particular form or structure of furnace, as such may be varied in accordance with the conditions existing in the particular foundry wherein this method is to be put into practice.

In melting the scrap, the slag generated by the oxidizing influence of the first and following meltings, is partly retained in the melting compartment or zone of the furnace, with a portion of the fluid manganese steel scrap, for protecting the metal of the subsequent meltings, the pre-heated scrap being thus immersed therein and protected from further oxidizing influences. As soon as the pre-heated scrap begins to melt, the flame is made as reducing as is consistent with the temperature, which should not only be maintained but slightly increased. As the metal passes into the molten condition, the manganese has a tendency to rapidly oxidize and form a heavy slag on the surface of the bath. This of course reduces the manganese content of the steel, and is a condition requiring immediate correction, in order to preserve the correct analysis of the final product. In this event, the manganese in the slag is driven out to again be taken up by the steel, the reduction being effected by adding to the slag a reducing agent, such as coal, coke, charcoal, or any carbonaceous material, or silicon and aluminum, that will combine with the oxygen without having an injurious effect upon the steel. This added carbon, combining with the oxygen, held in combination with the manganese, passes from the furnace in the form of carbonic anhydrid gas, while the silicon and aluminum contained in the metal, and whose affinity for oxygen at the high temperatures of the furnace is greater than that of manganese, are themselves oxidized, thereby reducing the oxid of manganese to the metallic state or condition.

While by other methods heretofore attempted for the utilization of manganese steel scrap in the production of manganese steel, a metal has resulted too high in carbon, and consequently of poor quality, no such result follows from the present method. If, however, at any time should the carbon content of the scrap become too high, it may be reduced to its proper percentage by oxidation of the carbon without oxidation of the manganese. To effect this result, manganese ore, such as pyrolusite, hausmannite, or any oxid of manganese is charged into the bath in proper quantity, the oxidation of the carbon being accompanied by a reduction of the manganese from the ore, the manganese being taken up by the metal.

While melting the decarbonized iron, and also the manganese steel scrap, I also melt, in any suitable furnace, a predetermined quantity of ferro-manganese, this quantity, as I have learned from numerous experiments, being approximately 8% of the total, that is 8% of ferro-manganese, containing about 80% of manganese and about 5.75 per cent. carbon at a temperature approximately 1350° C. When all three of these separate melts are in readiness, each of the same, with as little delay as possible, is tapped or drawn from its respective furnace into a ladle or other suitable receptacle previously heated, to a high degree of temperature, the ferro-manganese being preferably first drawn into the ladle, then the manganese steel scrap, and lastly the decarbonized iron, the latter, as before stated, being prepared at much the higher degree of heat. By thus mixing the metals the most thorough distribution of the manganese and carbon throughout the bath is accomplished, although for convenience, at times, I have first drawn the manganese steel scrap into the ladle, then the ferro-manganese, and finally the decarbonized iron.

It will be understood from the foregoing that in my improved process I have at all times avoided subjecting the manganese steel scrap to temperatures sufficiently high to cause the elimination of the manganese content; in fact, without doctoring or treating the slag to drive back into the metal any of the manganese content therein, the molten scrap has analyzed from 8 to 10% manganese, the test metal being taken from the trough while being tapped into the ladle. Furthermore, by melting the three metals separately, and each at a temperature to preserve its constituents, and combining them while each is in a molten state, results in a product of excellent quality, superior even to ordinary manganese steel. I would also have it clearly understood that while I have above mentioned the percentage of decarbonized iron as approximately 55% of the total, the manganese steel scrap 37% of the total, and the ferromanganese 8% of the total, yet I do not confine my method to these particular figures, as I have, during my many experiments, produced excellent metal by utilizing 49% of decarbonized iron, 49% of manganese steel scrap, and 2% of ferromanganese, and hence it will be seen that the relative proportions of the metals may be widely varied without in any way detracting from the quality of the finished product. The gist of the invention lies in fact that the manganese steel scrap is melted in a separate furnace at a comparatively low degree of heat and subsequently combined with the decarbonized iron and ferromanganese, also melted in separate furnaces, the decarbonized iron being treated or melted at a much higher degree of temperature than the manganese steel scrap and the ferromanganese, whereby to bring the scrap and ferromanganese up to the proper temperature for pouring when combined with the decarbonized iron. I would also have it understood that I do not limit my invention to the employment of decarbonized iron, as I have on many occasions produced a metal from manganese steel scrap and ferromanganese without the addition of decarbonized iron, such metals, however, by reason of the low temperature at which they are melted and combined, being employed more particularly for castings which may be poured from metal having a comparatively low degree of temperature. In the production of this metal I melt the manganese steel scrap in every way the same as before described, and add thereto from 3% to 4% of melted ferromanganese, the two metals being combined in a common receptacle previously heated, as in instances before described.

What I claim is:—

1. The method of making manganese steel consisting in melting in separate furnaces decarbonized iron, manganese steel scrap, and ferro-manganese, and then combining the molten metals in a common receptacle.

2. The method of making manganese steel consisting in melting in separate furnaces decarbonized iron, manganese steel scrap, and ferro-manganese, and then combining them in a common receptacle while the temperature of the decarbonized iron is in excess of that of the other of said metals.

3. The method of making manganese steel consisting in heating in separate furnaces decarbonized iron to a temperature of about 1650° C., manganese steel scrap to a temperature of about 1400° C., and ferro-manganese to about 1350° C., and combining them at approximately the above-mentioned temperatures in a common receptacle.

4. The process of making manganese steel consisting in heating about 55% of decarbonized iron to a temperature approximating 1650° C., heating about 37% of manganese steel scrap containing about 12% manganese to a temperature approximating 1400° C., and heating about 8% of 80% ferro-manganese to a temperature approximating 1350° C., and combining the metals at approximately the above temperatures in a common receptacle.

5. The process of making manganese steel consisting in combining with molten decarbonized iron and ferro-manganese, a quantity of manganese steel scrap, melted in a separate furnace, and at a temperature lower than that of the decarbonized iron.

6. The process of making manganese steel consisting in melting a quantity of manganese steel scrap, while protecting the same from oxidation and decarbonization by the slag and residue from the previous heat, and subsequently combining said molten scrap with ferro-manganese and with decarbonized iron melted in a separate furnace and at a temperature in excess of that of said scrap 7. The process of making manganese steel consisting in melting manganese steel scrap at a comparatively low temperature, while protected with the slag of the previous melt, and then combining the molten scrap with metals melted and drawn from other furnaces.

Signed at Chicago Heights in the county of Cook and State of Illinois this 9th day of February A. D. 1914.

WESLEY G. NICHOLS.

Witnesses:
M. I. La Zelle,
Charles Fantshorn.